Feb. 18, 1936.  W. G. THOMPSON  2,031,435
ELECTRODE ARRANGEMENT FOR CONTROLLING ELECTRIC ARCS
Filed Oct. 12, 1934
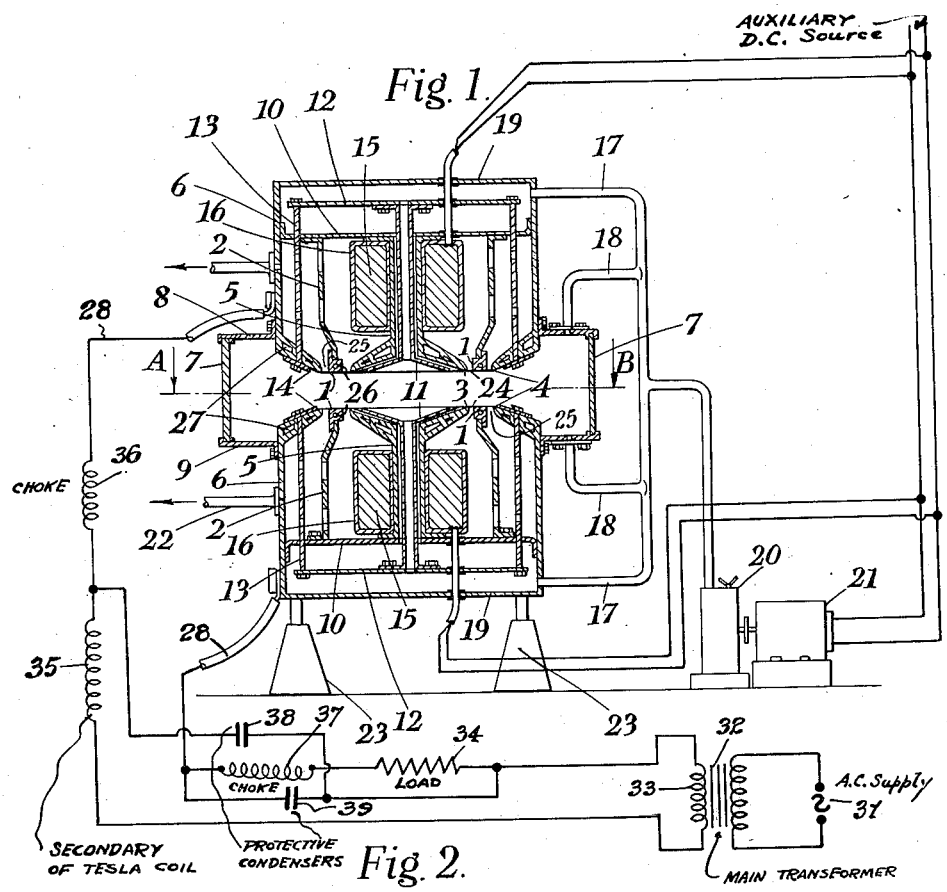
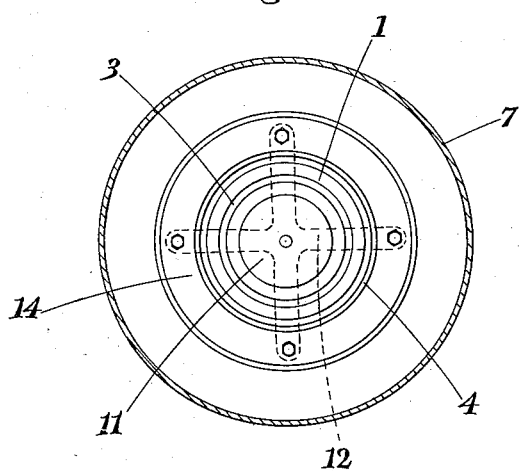
INVENTOR
William G. Thompson
BY
*[signature]*
ATTORNEY Patented Feb. 18, 1936

2,031,435

UNITED STATES PATENT OFFICE 2,031,435

ELECTRODE ARRANGEMENT FOR CONTROLLING ELECTRIC ARCS

William George Thompson, Wembley, England, assignor to The General Electric Company Limited, London, England Application October 12, 1934, Serial No. 748,022
In Great Britain October 10, 1933

5 Claims. (Cl. 175—363)

This invention relates to electrode arrangements for controlling electric arcs and is more particularly concerned with electrode arrangements for electric arc converters, although some features thereof may be usefully employed in connection with alternating current circuit interrupters. One object of the invention is the provision of improved electrode arrangements whereby arcs may be reliably controlled. Another object is the provision of electrode arrangements such that large arcing currents may be carried by the electrodes without undue heating thereof.

An electrode arrangement for controlling an electric arc fed from an alternating power supply according to the present invention comprises an electrode with a relatively long but narrow working face and means adapted to produce magnetic flux having a component across the said working face, provision being made for producing a fluid flow adapted to assist in maintaining the arc rooted on the working face.

According to the invention, moreover, an electrode arrangement comprises electrodes with opposed relatively long but narrow working faces and means for causing relative movement in a direction along the length of the working faces between the latter and an arc rooted thereon and narrow ducts on opposite sides of the working faces for the passage of fluid directed towards the said faces from both sides thereof.

Further, in accordance with the invention we provide an arrangement comprising an electrode giving a long path for the root of an arc caused to move over the working face of the electrode, means for causing relative movement between the said face and the root of an arc seated thereon, and an initiating electrode arranged adjacent to the first electrode, provision being made for producing a fluid flow adapted to transfer an arc from the initiating electrode to the first electrode and by acting at opposite sides of the working face of the electrode to maintain the arc rooted on the said face.

Thus one electrode arrangement for use in an electric arc converter comprises an electrode providing an annular or equivalent endless working face, means for causing relative movement in a direction along the length of the working face between the latter and an arc rooted thereon and an initiating electrode extending alongside the first electrode and from which an arc after initiation thereat is adapted to be transferred to the first electrode, provision being made for producing a fluid flow adapted to maintain the arc rooted on the working face.

Actually the initiating electrode is coterminus with the first electrode and is disposed on both sides of the latter.

Provision is made for passing a stream of fluid adapted to carry the arc from the initiating electrode to the first electrode over the initiating electrode towards the first electrode from opposite sides thereof. In fact provision is made for passing a stream of fluid towards the first electrode from both sides and around the whole circumference thereof and past the working face of the electrode through narrow ducts communicating with the arcing gap at or towards opposite sides of the working face of the first electrode. Means for producing a magnetic field is provided for effecting movement of the arc rooted on the first electrode relative to the latter and at least the first electrode is formed or associated with ducts for the passage of cooling fluid.

It will be understood that each phase of the converter is provided with two sets of electrodes such as described above, the sets being similar to one another and the working faces of the electrodes of the two sets being disposed opposite one another so that there are short gaps therebetween.

One arrangement of converter in accordance with the invention will now be described by way of example with reference to the accompanying drawings, Figure 1 of which shows a central sectional elevation of one phase of the converter and Figure 2 a plan on the line A—B of Figure 1.

In Figure 1, since the parts above and below the horizontal plane through the line A—B are similar, they are similarly referenced. Each of the electrode faces 1 of the opposing electrodes of the phase are constituted by an annular part on the one end edge of a cylinder 2. The annular electrode 1 is disposed in the annular gap between two inner and outer parts 3 and 4 respectively of strongly divergent nozzle shape and convergent nozzle shape, forming the end portions of two cylinders 5, 6 concentric with the cylinder 2. The end of the cylinder 6 remote from the arc gap is closed. The parts 3 and 4 constitute the initiating electrodes. The electrodes 1, 3, and 4 above the line A—B are electrically connected together and similarly the electrodes 1, 3, and 4 below the line A—B.

The upper and lower cylinders 6 are in effect housings for the upper and lower electrodes and are connected by a further insulating cylinder 7 and annular top and bottom face members 8 and 9, the whole arrangement being made gas tight.

A circular plate 10 is bolted to the interior of the cylinder 6 and carries the cylinder 2 and the cylinder 5. The plate 10 is centrally apertured and through the cylinder 5 extends an annular throat piece 11 of magnetic material, which is shaped at one end to fit the divergent nozzle-like end 3 of the cylinder 5. The other end of the cylinder 11 extends through the plate 10 and is bolted to a spider member 12 also of magnetizable material.

From the ends of the arms of the spider member there extends rods 13 of magnetizable material which pass through the convergent nozzle portions 4 and are attached to an annulus 14 of magnetizable material. A winding 15 is mounted on the cylinder 5 and consequently when the winding 15 is energized there is a flux path created over the throat 11, spider 12, rods 13 and annulus 14. In other words there is a strong magnetic field set up in the gap between the parts 3 and 4. The electromagnetic winding 15 is enclosed in a metal sheathing 16 to protect it from the hot arc products.

The spider 12 is suitably apertured to permit of gaseous fluid being blown through the throat 11 and pipes 17, 18 respectively of insulating material lead into the space between the plate 10 and the end wall 19 of the cylinder 6 and the space enclosed by the cylinder 7. The pipes 17 and 18 are connected to the pressure side of an air pump 20 driven in any suitable manner for example by an electric motor 21. Outlet pipes 22 are provided from the space between the electrodes and the plate 10 to which the electrode supporting cylinder 2 extends; suitable apertures are provided in the cylinder 2 to provide communication for gaseous fluid from the inside to the outside of this cylinder.

The lower cylinder 6 is mounted on insulators 23, and connections are made by bolting conductors 28 to the exterior of the cylindrical containers 6.

From the foregoing description it will be realized that the two sets of electrodes 1 provide between the inner parts of the initiating electrodes 3, 4 a circular, outwardly extending, tapering, nozzle-like passage 24 leading to the annular spaces within the cylinder 2 and between the outer parts of the initiating electrodes a circular, inwardly extending, tapering, nozzle-like passage 25 leading to the space between the cylinders 2 and 6. Accordingly in operation the stream of air supplied in the manner above indicated flows through the throat 11 outwardly over the surfaces of the inner parts 3 of the initiating electrodes and through the gaps between the said parts 3 and the first electrode 1. The construction is such that substantially uniform flow of gas is obtained around the whole lengths of the gaps. The gas flowing past a first electrode passes into the container directly associated with the latter and through an outlet aperture in the container wall. Means may be provided for adjusting separately the velocity of the inwardly and outwardly directed parts of the gas stream.

The first electrodes 1 are slightly set back from the initiating electrodes 3, 4. Thus the gap between upper and lower sets of the former may, for example, be twice as long as the gap between the latter. Means may be provided whereby the lengths of the gaps between the initiating electrodes and between the first electrodes may readily and separately be adjusted.

Each of the first electrodes 1 is in the form of a hollow ring of rectangular cross section and provision is made for circulating suitable cooling liquid through the interior 26 of the ring. Liquid may also be circulated through cavities 27 in the initiating electrodes. The magnetizing coils 15 may also be cooled by passing fluid through the armatures or/and through pipes or jackets surrounding the coils.

In the circuit arrangement shown in Figure 1 the converter represented by the main electrode 1 and initiating electrodes 3 and 4 is supplied from an alternating current source 31 through a transformer 32, the secondary winding 33 of which is connected in series with a resistance 34 representing the load, choke 37, the converter itself, choke 36 and the secondary winding 35 of a Tesla coil for applying initiating voltages. the chokes 36 and 37 preventing the high frequency impulses from the Tesla coil injuring the transformer 32 or load 34, condensers 38, 39 being also provided.

In operation, an arc started by the Tesla coil arrangement between the initiating electrodes 3, 4 of the two sets is transferred by the stream of gas to the first electrodes 1 around which the arc is caused to move by the magnetic field thereat, thus preventing any one point of the electrode surfaces from becoming too hot and worn. At the zero point in the cycle the arc becomes extinguished and owing to the strong cooling of the first electrodes 1 and the diffusion of ions into the gaseous streams restriking of the arc until it is reinitiated between the initiating electrodes is prevented.

The arrangement described above may be modified in many different ways, for example, the sets of electrodes need not be similar. Thus one set may comprise a nozzle shaped control electrode surrounded by a relatively wide ring and the other set may comprise a cylindrical control electrode somewhat wider than the internal diameter of the ring and an outer nozzle ring providing a nozzle like space between itself and the outer part of the wide ring. In such cases gas flows outwardly from the nozzle-shaped control electrode and through the space between the latter and the wide ring. Gas also flows inwardly between the nozzle ring and the wide ring and through the space between the nozzle ring and the cylindrical central electrode. The initiating electrodes are constituted by the nozzle shaped central electrode, the nozzle ring and the opposing parts of the cylindrical central electrode and the wide ring. The working faces of the first electrodes are constituted by the opposing parts of the wide ring and the cylindrical central electrodes.

I claim:—

1. An arrangement for controlling an electric arc fed from an alternating current supply, comprising in combination a pair of opposed electrodes, each of said electrodes having a long but narrow working face, nozzle elements on each side of the respective working faces and separated therefrom by narrow ducts, means for causing a flow of cooling fluid past the working faces of the electrodes and on opposite sides thereof through said ducts and cooperating magnet members arranged to produce a magnetic flux component across the respective working faces for causing movement of the arc along said working faces.

2. An arrangement for controlling an electric arc fed from an alternating current supply, comprising in combination a pair of annular main electrodes with opposed working faces, arc initiating electrodes extending alongside each main electrode and separated therefrom by narrow ducts, means for causing a flow of cooling fluid past the working faces of the main electrodes and on opposite sides thereof through said ducts and means for producing a magnetic flux component across the respective working faces of the main electrodes for causing movement of the arc along said working faces.

3. An arrangement for controlling an electric arc fed from an alternating current supply, comprising in combination a pair of annular main electrodes with opposed working faces, arc initiating annular electrodes on each side of and extending along the main electrodes, the working faces of said main electrodes being separated from the initiating electrodes by narrow ducts, means for causing a flow of cooling fluid past the working faces of the main electrodes and on opposite sides thereof through said ducts and means for producing a magnetic flux component across the working faces of said main electrodes for causing movement of the arc along said working faces.

4. An arrangement for controlling an electric arc fed from an alternating current supply comprising in combination a pair of annular main electrodes with opposed working faces, annular arc initiating electrodes arranged nozzle-like on each side of said main electrodes, the latter being separated therefrom by narrow ducts, means for causing a flow of cooling fluid over the initiating electrodes and the associated main electrodes, through said ducts and means for producing a magnetic flux component across the working faces of said main electrodes for causing movement of the arc along said working faces.

5. An arrangement for controlling an electric arc fed from an alternating current supply comprising in combination main electrodes with opposed working faces, said main electrodes being provided with internal channels for the passage therethrough of cooling fluid, arc initiating electrodes extending alongside said main electrodes and separated therefrom by narrow ducts, means for causing a flow of fluid past the working faces of the main electrodes on opposite sides thereof and through the said ducts and means for producing a magnetic flux component across the working faces of said main electrodes for causing movement of the arc along said working faces.

WILLIAM GEORGE THOMPSON.